(No Model.)
D. W. DUDDERAR.
ATTACHMENT FOR VEHICLE THILLS.
No. 349,930. Patented Sept. 28, 1886.
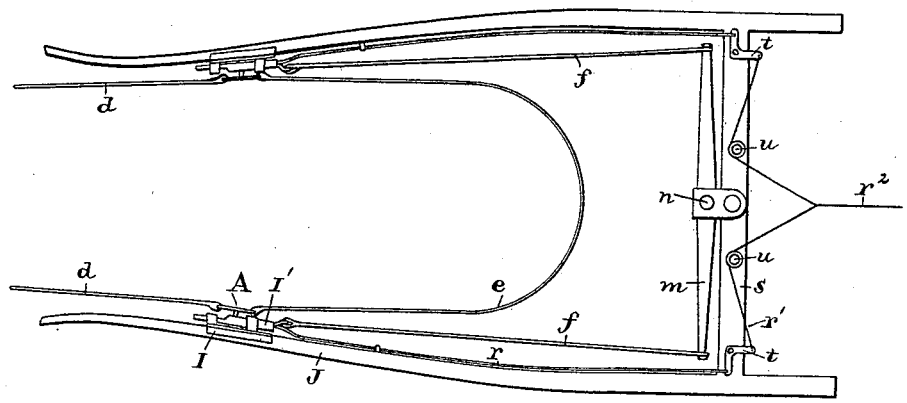
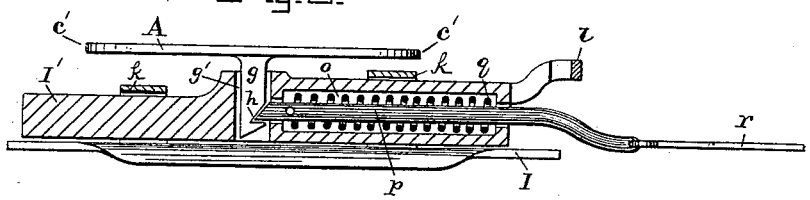
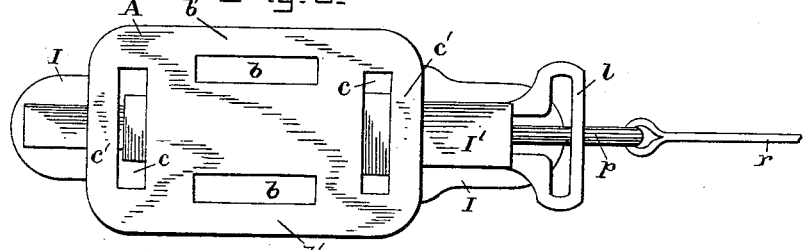
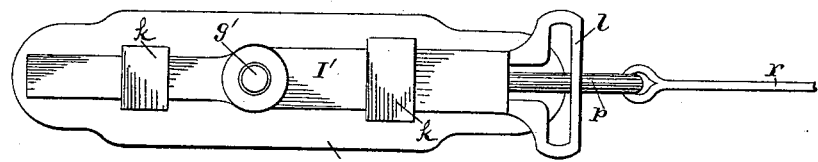
WITNESSES:
A. E. Eader
John E. Morris.
INVENTOR:
D. W. Dudderar
BY Chas B. Mann
ATTORNEY.

United States Patent Office.

DANIEL W. DUDDERAR, OF TAYLORSVILLE, MARYLAND.

ATTACHMENT FOR VEHICLE-THILLS.

SPECIFICATION forming part of Letters Patent No. 349,930, dated September 28, 1886.

Application filed August 6, 1886. Serial No. 210,178. (No model.)

*To all whom it may concern:*

Be it known that I, DANIEL W. DUDDERAR, a citizen of the United States, residing at Taylorsville, in the county of Carroll and State of Maryland, have invented certain new and useful Improvements in an Attachment for Thills of Vehicles, of the following is a specification.

This invention relates to an attachment for thills of vehicles, whereby to facilitate the attachment of a harnessed animal.

The invention is illustrated in the accompanying drawings, in which Figure 1 is a view of the thills of a vehicle and a portion of the harness, and shows the application of the invention. Fig. 2 is a longitudinal section of the thill attachment. Fig. 3 is a side view of the complete device. Fig. 4 is a side view of the part which is to be attached permanently to the thill.

The invention comprises two parts, one for attachment to the thill, and the other for attachment to the harness.

The harness-plate A has slots $b$ and $c$, each of which forms a bar, $b'$ and $c'$, to which the straps of the harness are secured. The harness-saddle strap is intended to be attached to the upper bar $b'$, and the belly-band to the lower bar $b'$. The harness-tug $d$ is attached to the front bar $c'$, and the breeching or hold-back strap $e$ is attached to the back bar $c'$. The trace $f$ will be referred to hereinafter. On the outer side the harness-plate A has a projecting stud, $g$, which is provided on the side with a notch, $h$. The part which is attached to the thill J consists of a plate, I, which is to be secured by bolts or other suitable means. A trace-hitch, I', is a device exteriorly shaped similar to a door-bolt, and is loosely connected with the plate I by two guides or keepers, $k$, on the plate. The trace-hitch is thus enabled to move endwise back and forth on the plate, which movement effects an important result. The trace-hitch has a socket or hole, $g'$, to receive the stud $g$, which is on the harness-plate. It also has at its back end a loop, $l$, to which one end of the trace $f$ is attached, while the other end is attached as usual to the single-tree $m$. It will now be seen that when an animal is harnessed in a thill provided with this device he may walk with the usual freedom and without producing galled shoulders—a result that is attributable to the endwise or back-and-forth movement of the trace-hitch I'. With this construction the single-tree will move on its pivot $n$ in the usual manner.

Any suitable means may be employed to confine the stud $g$ in the socket $g'$ and thereby keep the harnessed animal "hitched" to the thills. For this purpose I construct the trace-hitch I' hollow or tubular, (see Fig. 2,) as at $o$. A spring-bolt, $p$, is fitted in this tubular part. The spring $q$ surrounds the bolt and occupies the said tube. The arrangement is such that one end of the spring-bolt will engage with the notch $h$ on the stud $g$ and confine it. The other end of the spring-bolt $p$ projects back from the trace-hitch I' and has attached to it a wire or cord, $r$, which extends along the thill J to the cross-bar $s$, where is located a bell-crank lever, $t$.

The description thus far relates specially to one side of the harness and to one only of the pair of thills. It is therefore proper to state here that both sides are equipped exactly alike, and as hereinbefore described. Each of the two bell-crank levers $t$ on the thills have a wire or cord, $r'$, which lead toward the center or toward each other and pass over a pulley, $u$. The two wires or cords, as the case may be, then unite into a single one, $r^2$, which thence passes to the vehicle, where it may be within reach of the driver. It will be seen that by pulling on the wire $r^2$ both of the spring-bolts $p$ may be drawn from the studs $g$, and the latter may then disengage from the sockets $g'$.

Having described my invention, I claim and desire to secure by Letters Patent of the United States—

1. The combination of the trace-hitch I', loosely connected with a thill-plate, I, so as to be movable endwise, and provided with a side socket, $g'$, and a loop, $l$, for the trace, and a harness-plate, A, having slots and bars for the attachment of straps, and provided with a stud, $g$, to enter the said socket, for the purpose set forth.

2. The combination of a thill-plate, I, having keepers $k$, a trace-hitch, I', movable endwise in the said keepers and provided with a side socket, $g'$, and a loop, $l$, for the trace, and a harness-plate, A, provided with a stud, $g$, to enter the said socket, for the purpose set forth.

3. The combination of a thill-plate, I, having keepers $k$, a trace-hitch, I', movable endwise in the said keepers and provided with a side socket, $g'$, a tubular portion, $o$, and a loop, $l$, for the trace, a harness-plate, A, provided with a stud, $g$, having a notch, $h$, and a spring-bolt, $p$, fitted in said tubular portion of the trace-hitch, as set forth.

In testimony whereof I affix my signature in the presence of two witnesses.

DANIEL W. DUDDERAR.

Witnesses:
JOHN E. MORRIS,
JNO. T. MADDOX.